(12) United States Patent
Park

(10) Patent No.: US 10,378,429 B2
(45) Date of Patent: *Aug. 13, 2019

(54) HYBRID INTERCOOLER SYSTEM AND CONTROL METHOD THEREOF

(71) Applicant: Hyundai Motor Company, Seoul (KR)

(72) Inventor: Dang-Hee Park, Seoul (KR)

(73) Assignee: Hyundai Motor Company, Seoul (KR)

(*) Notice: Subject to any disclaimer, the term of this patent is extended or adjusted under 35 U.S.C. 154(b) by 243 days.

This patent is subject to a terminal disclaimer.

(21) Appl. No.: 15/231,963

(22) Filed: Aug. 9, 2016

(65) Prior Publication Data
US 2017/0122186 A1    May 4, 2017

(30) Foreign Application Priority Data
Oct. 28, 2015  (KR) .................. 10-2015-0150358

(51) Int. Cl.
| | |
|---|---|
| *F02B 29/04* | (2006.01) |
| *F28F 9/02* | (2006.01) |
| *F28D 1/04* | (2006.01) |
| *F28D 1/053* | (2006.01) |
| *F28D 7/00* | (2006.01) |

(Continued)

(52) U.S. Cl.
CPC ...... *F02B 29/0412* (2013.01); *F02B 29/0406* (2013.01); *F02B 29/0425* (2013.01); *F02B 29/0443* (2013.01); *F02B 29/0456* (2013.01); *F02B 29/0462* (2013.01); *F02B 29/0493* (2013.01); *F28D 1/0461* (2013.01); *F28D 1/05366* (2013.01); *F28D 7/0083* (2013.01); *F28D 7/08* (2013.01); *F28D 7/1684* (2013.01);

(Continued)

(58) Field of Classification Search
CPC .............. F02B 29/0412; F02B 29/0406; F02B 29/0425; F02B 29/0443; F02B 29/0456; F02B 29/0462; F02B 29/0493; F28D 1/0461; F28D 1/05366; F28D 7/0083; F28D 7/08; F28D 7/1684; F28D 2021/0082; Y02T 10/146
USPC ............................................ 60/599; 123/563
See application file for complete search history.

(56) References Cited

U.S. PATENT DOCUMENTS

| | | | | |
|---|---|---|---|---|
| 4,520,767 A | * | 6/1985 | Roettgen ............. | F02B 29/0443 123/41.1 |
| 5,353,757 A | * | 10/1994 | Susa ................... | F02B 29/0443 123/563 |

(Continued)

FOREIGN PATENT DOCUMENTS

| | | | | |
|---|---|---|---|---|
| EP | 2037200 A2 | * | 3/2009 | ........... F28D 1/0461 |
| JP | S63255516 A | | 10/1988 | |

(Continued)

*Primary Examiner* — Thai Ba Trieu
(74) *Attorney, Agent, or Firm* — Mintz Levin Cohn Ferris Glovsky and Popeo, P.C.; Peter F. Corless

(57) ABSTRACT

A hybrid intercooler system is provided and includes an air cooler that is configured to exchange heat with exterior air passing through an outer wall of a plurality of compressed intake air paths to cool a compressed intake air passing through the inside of the compressed intake air paths. Further, a water cooler is configured to exchange heat between a water cooler coolant enclosing the outer wall of the compressed intake air paths and the compressed intake air which is cooled in the air cooler. The water cooler includes a water cooler coolant tank that encloses the compressed intake air paths.

13 Claims, 6 Drawing Sheets

(51) Int. Cl.
  *F28D 7/08* (2006.01)
  *F28D 7/16* (2006.01)
  *F28D 21/00* (2006.01)
(52) U.S. Cl.
  CPC .... *F28F 9/0234* (2013.01); *F28D 2021/0082* (2013.01); *Y02T 10/146* (2013.01)

(56) References Cited

U.S. PATENT DOCUMENTS

| | | | | |
|---|---|---|---|---|
| 6,510,690 | B2* | 1/2003 | Furukawa | F02B 29/0412 |
| | | | | 60/599 |
| 6,748,934 | B2* | 6/2004 | Natkin | F02B 29/0443 |
| | | | | 60/599 |
| 6,796,134 | B1 | 9/2004 | Bucknell et al. | |
| 7,841,393 | B2* | 11/2010 | Sekito | F28D 1/05366 |
| | | | | 165/174 |
| 8,943,823 | B2* | 2/2015 | Fiveland | F02D 29/06 |
| | | | | 123/562 |
| 2009/0050082 | A1* | 2/2009 | Iwasaki | F04D 13/06 |
| | | | | 123/41.49 |
| 2009/0250019 | A1* | 10/2009 | Dahl | F01P 11/028 |
| | | | | 123/41.21 |
| 2010/0044019 | A1* | 2/2010 | Maeda | F28D 7/0041 |
| | | | | 165/151 |
| 2011/0113823 | A1* | 5/2011 | Joboji | F25B 39/022 |
| | | | | 62/515 |
| 2015/0292820 | A1* | 10/2015 | Katoh | F25B 39/04 |
| | | | | 165/140 |
| 2016/0069329 | A1* | 3/2016 | Brodetsky | F03G 6/04 |
| | | | | 60/641.14 |
| 2017/0082014 | A1* | 3/2017 | Park | F02B 29/0443 |
| 2017/0246934 | A1* | 8/2017 | Lee | B60H 1/3229 |
| 2017/0254257 | A1* | 9/2017 | Park | F02B 29/0443 |
| 2017/0335747 | A1* | 11/2017 | Park | F02B 29/0462 |

FOREIGN PATENT DOCUMENTS

| | | |
|---|---|---|
| JP | 2005-002983 A | 1/2005 |
| JP | 2009-068809 A | 4/2009 |
| JP | 2010090729 A | 4/2010 |
| KR | 1995-009398 Y1 | 10/1995 |
| KR | 1998-0064745 U | 11/1998 |
| KR | 2003-0085220 A | 11/2003 |
| KR | 2004-0021935 A | 3/2004 |
| KR | 2005-0028106 A | 3/2005 |
| KR | 20110061216 A | 6/2011 |

* cited by examiner

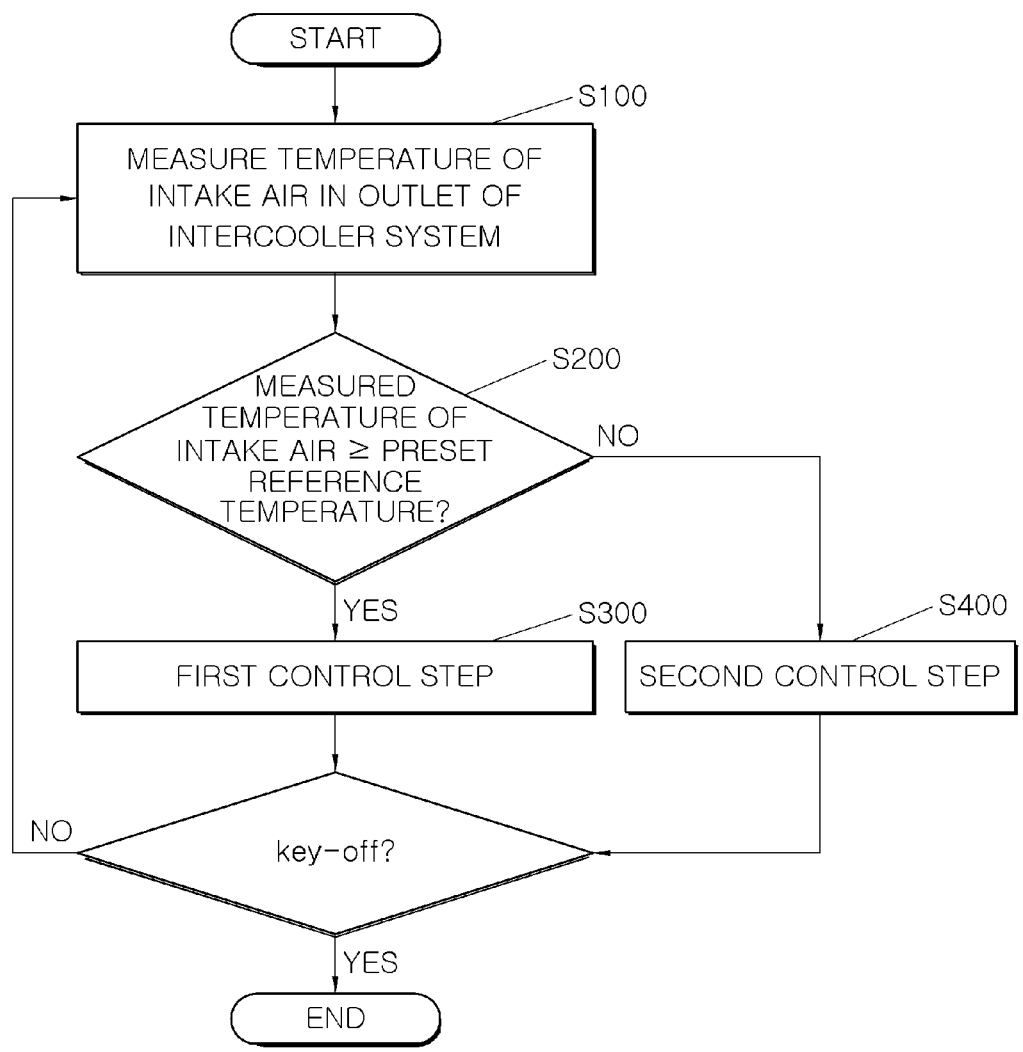

HYBRID INTERCOOLER SYSTEM AND CONTROL METHOD THEREOF

CROSS-REFERENCE TO RELATED APPLICATIONS

This application claims priority to Korean Patent Application No. 10-2015-0150358, filed on Oct. 28, 2015, which is incorporated herein by reference in its entirety.

BACKGROUND

Field of the Invention

The present invention relates to a hybrid intercooler system and a control method thereof, and more particularly, to a hybrid intercooler system that stabilizes a temperature of an intake air passing through an inlet of an intercooler using a water cooler, and significantly increases cooling efficiency of the intercooler using an air cooler, and a control method thereof.

Description of Related Art

Generally, a turbocharger is a supercharging structure that compresses intake air supplied to an engine with exhaust power of an exhaust gas to supply the compressed intake air to a cylinder, thereby increasing intake charging efficiency of the engine and increasing mean effective pressure to increase an output of the engine. The turbocharger has a structure in which a compressor and a turbine generally are disposed in the same axial line, the turbine is rotated by the exhaust power of the exhaust gas output through an exhaust pipe to rotate the compressor disposed in the same axial line as the turbine, to thus compress an air introduced through an intake manifold to be supplied to the cylinder.

Meanwhile, a temperature of the air compressed by the turbocharger described above is increased, therefore when the compressed air is supplied to a combustion chamber, an increase rate of air density is decreased thus causing a deterioration of a charging efficiency or knocking may easily be caused. An intercooler has been provided to decrease the temperature of the supercharged air. In particular, FIG. 1 is a view for describing an intercooler in accordance with the related art. Referring to FIG. 1, a density of an intake air cooled while passing through the intercooler is maintained to be high and a temperature thereof is decreased, thereby improving combustion power.

Generally, the intercooler is divided into an air-cooling type intercooler and a water-cooling type intercooler based on a cooling method. The air-cooling type intercooler has a structure in which the supercharged air passes through a plurality of tubes and is cooled by a cold air passing through a cooling fin integrally formed with the tubes. The water-cooling type intercool has a structure in which the air is cooled by a cooling channel contacting the tubes. In general, the air-cooling type intercooler has excellent cooling efficiency, but has a problem in that the cooling efficiency may be unstable due to a change in a temperature of the outside air, or the like. Further, the water-cooling type intercooler may maintain stable efficiency, but has a problem in that the cooling efficiency thereof is not as good as that of the air-cooling type intercooler.

SUMMARY

The present invention is directed to a hybrid intercooler system using multiple cooling media, which may improve cooling efficiency of an intercooler by integrating an air-cooling type intercooler and a water-cooling type intercooler and cooling the water-cooling type intercooler using an air-conditioning system without a separate cooling line, and a control method thereof.

Other objects and advantages of the present invention may be understood by the following description, and become apparent with reference to the exemplary embodiments of the present invention. Also, it is obvious to those skilled in the art to which the present invention pertains that the objects and advantages of the present invention can be realized by the means as claimed and combinations thereof.

In accordance with an exemplary embodiment of the present invention, a hybrid intercooler system may include: an air cooler 100 configured to exchange heat with exterior air passing through an outer wall of a plurality of compressed intake air paths 110 to cool a compressed intake air passing through the inside of the compressed intake air paths 110, and a water cooler 200 configured to exchange heat between a water cooler coolant enclosing the outer wall of the compressed intake air paths 110 and the compressed intake air which is cooled in the air cooler 100, in which the water cooler 200 may include a water cooler coolant tank 210 that encloses the compressed intake air paths.

The hybrid intercooler system may further include a bypass line 220 branched from a receiver drier 310, passing through the water cooler coolant tank 210, and configured to communicate with a condensation line 260 that connects a compressor 320 and an air-conditioner condenser 340. The bypass line 220 may be disposed to penetrate through between the compressed intake air paths 110 and an inner wall of the water cooler coolant tank 210. The bypass line 220 may be branched into a plurality of lines in a section in which it penetrates through between the compressed intake air paths 110 and the inner wall of the water cooler coolant tank 210.

The hybrid intercooler system may further include a bypass valve 330 installed on the bypass line 220 to open or close the bypass line 220 and a water cooler coolant circulation pump 350 installed on the bypass line 220 at a back part of the bypass valve 330 to exhaust an air-conditioner coolant in the bypass line 220 to the condensation line 260. The hybrid intercooler system may further include an expansion line 230 configured to provide communication between the receiver drier 310 and an expansion valve 360.

Additionally, the hybrid intercooler system may include an evaporation line 240 configured to provide communication between the expansion valve 360 and a heating core 370. A compression line 250 may be configured to provide communication between the heating core 370 and the compressor 320. The hybrid intercooler system may further include a gas-liquid separation line 270 configured to provide communication between the air-conditioner condenser 340 and the receiver drier 310. The water cooler coolant tank 210 may include a water cooler coolant inlet 211 that protrudes from an upper surface thereof and a water cooler coolant cap 212 configured to open or close the water cooler coolant inlet 211.

In accordance with another exemplary embodiment of the present invention, a control method of a hybrid intercooler system may include: measuring a temperature of an intake air in an outlet of the hybrid intercooler system (S100), determining whether the measured temperature of the intake air is greater than a preset reference temperature (S200), and opening the bypass valve 330 and operating the water cooler coolant circulation pump 350 when the measured temperature of the intake air is greater than the preset reference temperature (S300). The control method may further include closing the bypass valve 330 and stopping the operation of the water cooler coolant circulation pump 350 when the measured temperature of the intake air is less than the preset reference temperature (S400).

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein:

FIG. 6 is a flowchart of a control method of a hybrid intercooler system in accordance with another exemplary embodiment of the present invention.

DETAILED DESCRIPTION

Figure 1:
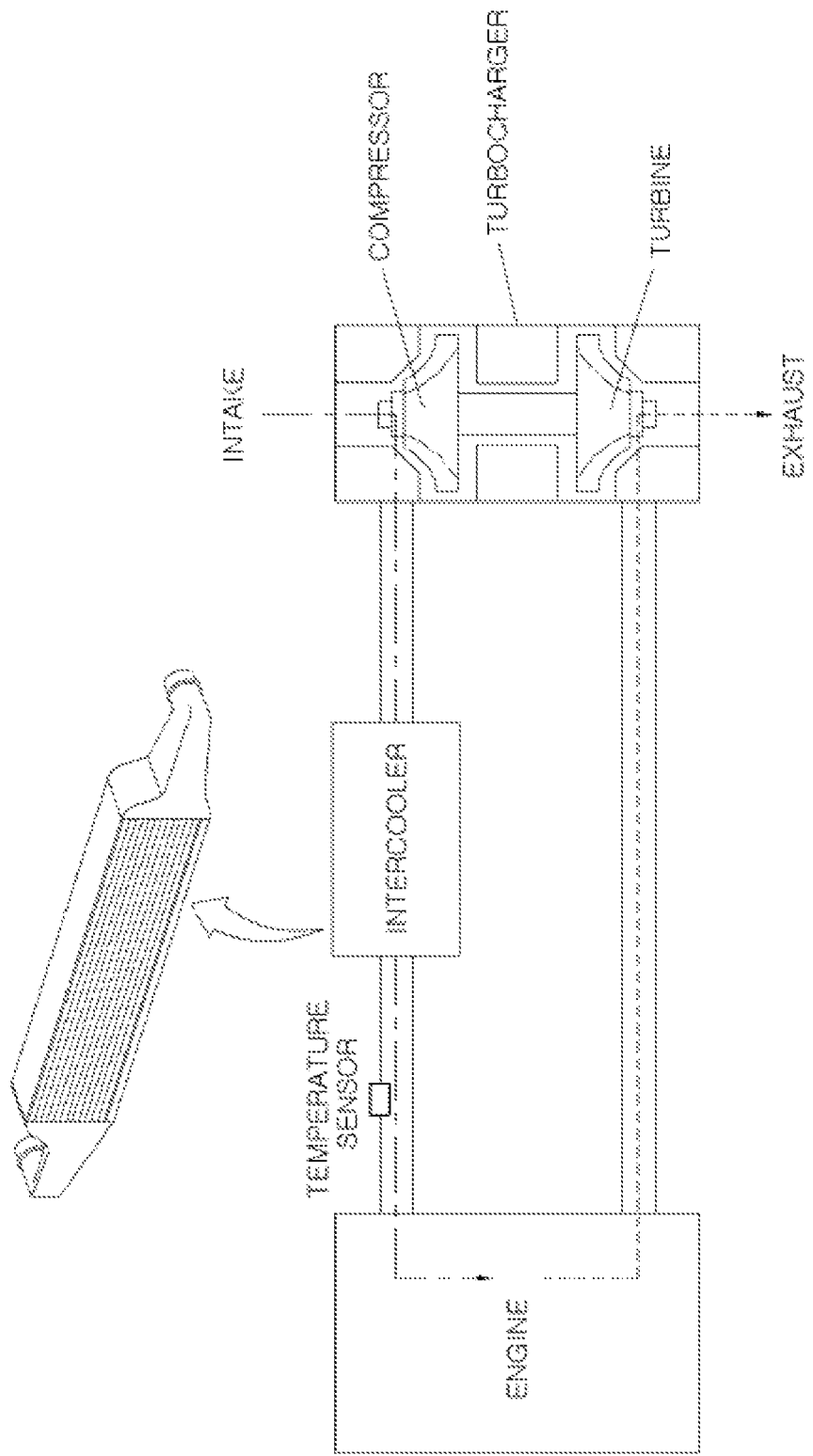
FIG. 1 is a view illustrating an intercooler in accordance with the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Terms and words used in the present specification and claims are not to be construed as a general or dictionary meaning but are to be construed as meaning and concepts meeting the technical ideas of the present invention based on a principle that the inventors can appropriately define the concepts of terms in order to describe their own inventions in best mode. Therefore, the configurations described in the exemplary embodiments and drawings of the present invention are merely most preferable embodiments but do not represent all of the technical spirit of the present invention. Thus, it should be understood that there may exist various equivalents and modifications for substituting those at the time of filing this application. Moreover, detailed descriptions related to well-known functions or configurations will be omitted in order not to unnecessarily obscure the gist of the present invention. Hereinafter, exemplary embodiments of the present invention will be described in detail with reference to the accompanying drawings.

Figure 2:
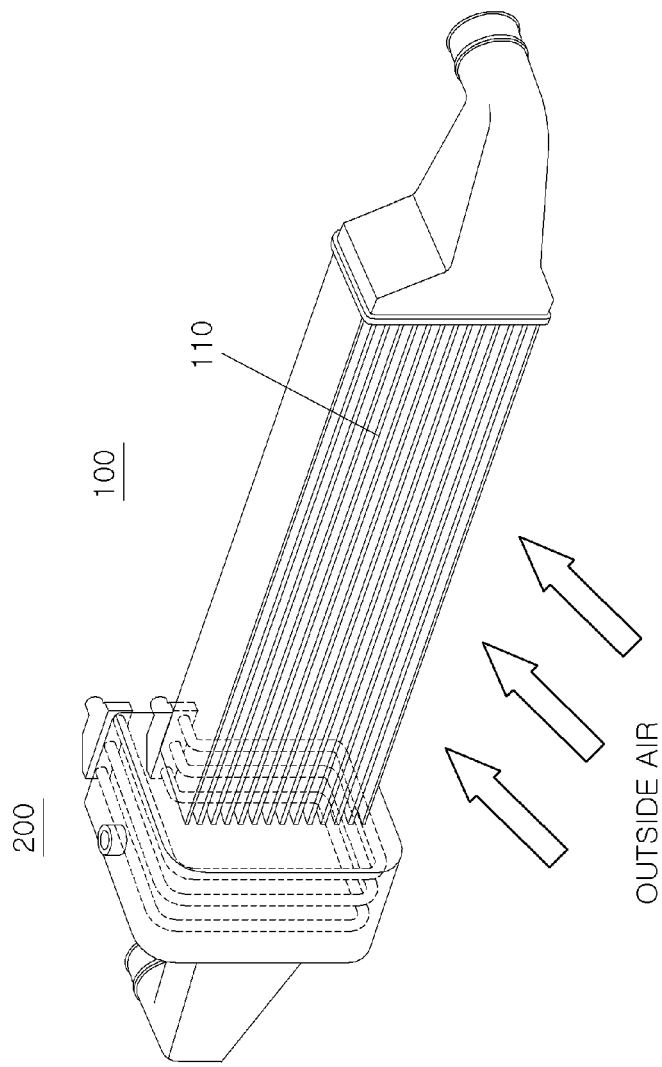
FIG. 2 is a partial view of a hybrid intercooler system in accordance with an exemplary embodiment of the present invention.
Figure 3:
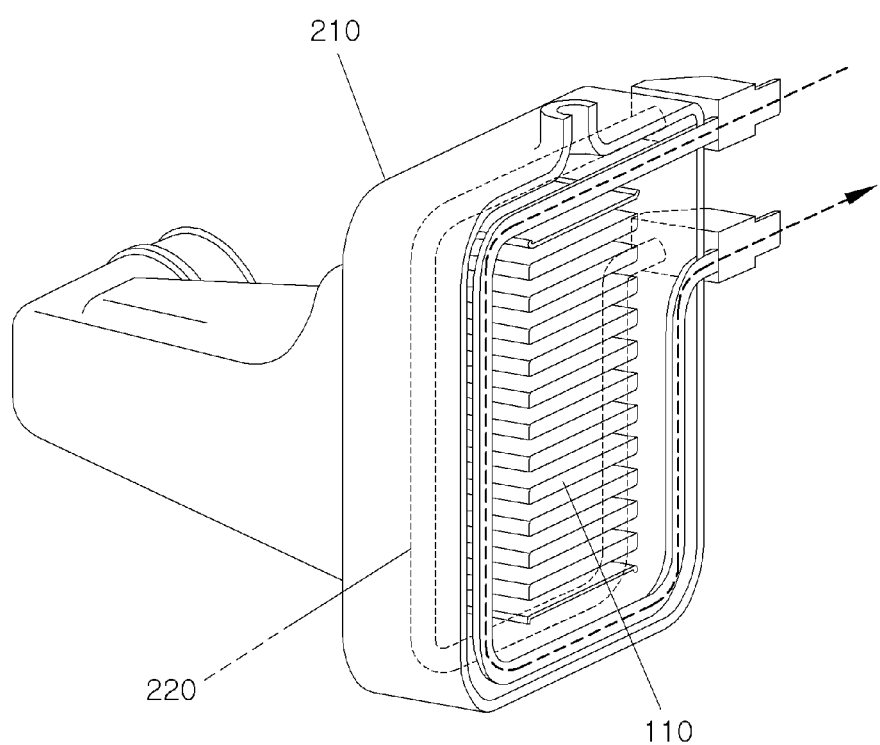
FIG. 3 is a cross-sectional view of a water cooler in the hybrid intercooler system in accordance with the exemplary embodiment of the present invention.
Figure 4:
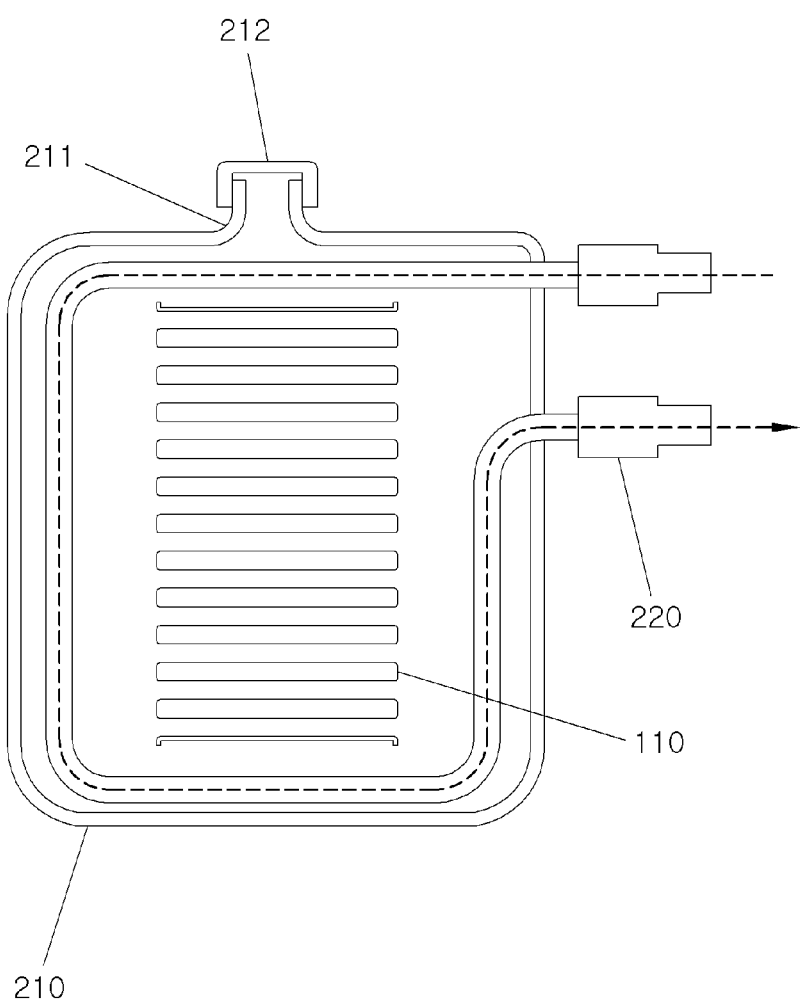
FIG. 4 is a cross-sectional view of the water cooler in the hybrid intercooler system in accordance with the exemplary embodiment of the present invention.
Figure 5:
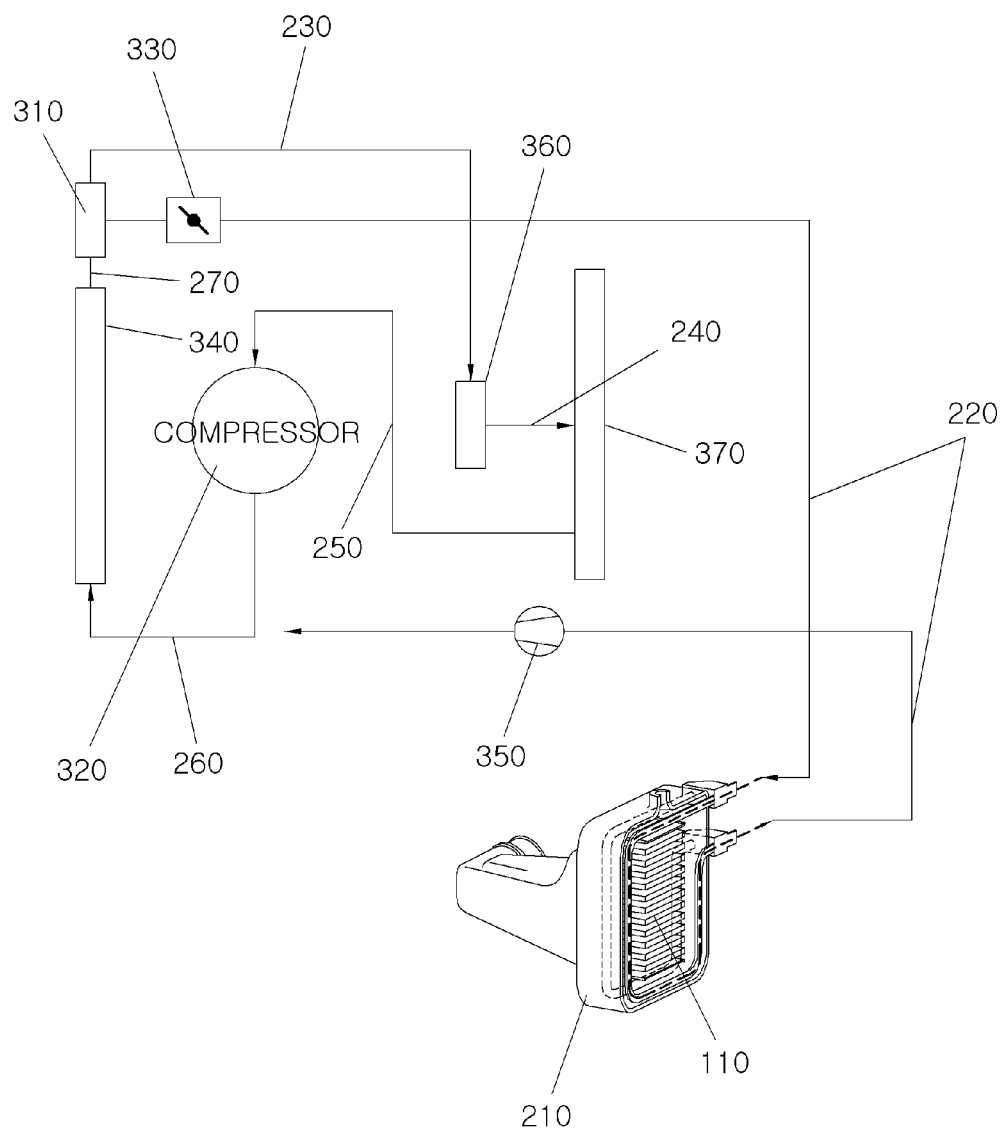
FIG. 5 is a block diagram of the hybrid intercooler system in accordance with the exemplary embodiment of the present invention.

FIG. 2 is a partial view of a hybrid intercooler system in accordance with an exemplary embodiment of the present invention, and FIG. 3 is a cross-sectional view of a water cooler in the hybrid intercooler system in accordance with the exemplary embodiment of the present invention. FIG. 4 is a cross-sectional view of the water cooler in the hybrid intercooler system in accordance with the exemplary embodiment of the present invention, and FIG. 5 is a block diagram of the hybrid intercooler system in accordance with the exemplary embodiment of the present invention. Referring to FIGS. 2 to 5, a hybrid intercooler system in accordance with an exemplary embodiment of the present invention may include an air cooler 100 and a water cooler 200.

Particularly, the air cooler 100 may be configured to exchange heat with the exterior air passing through an outer wall of a plurality of compressed intake air paths 110 to cool the compressed intake air passing through the inside of the compressed intake air path 110. Further, the water cooler 200 may be configured to exchange heat between a coolant of the water cooler enclosing the outer wall of the compressed intake air paths 110 and the compressed intake air which is cooled in the air cooler 100. As described above, the intake air compressed in the turbocharger may first pass through the air cooler 100 having high cooling efficiency to be primarily cooled, and then may be configured to pass though the water cooler 200 to be secondarily and more stably cooled. In other words, a temperature of the intake air in an outlet of the hybrid intercooler system may be effectively controlled while significantly decreasing consumed energy by disposing the water cooler in a section in which a temperature of the compressed intake air is deceased from intermediate temperature to low temperature in the process in which the hybrid intercooler system decreases the temperature of the compressed intake air from high temperature (about 120° C.-150° C.) to intermediate temperature (about 45° C.) and from intermediate temperature to low temperature (less than 35° C.). Hereinafter, the water cooler 200 of the present invention will be described in detail.

The water cooler 200 may include a water cooler coolant tank 210 and a bypass line 220. The water cooler coolant tank 210 may be disposed to enclose the compressed intake air paths 110. Further, a water cooler coolant may be filled in the water cooler coolant tank 210. Various water cooler coolants may be used in consideration of specific heat, in particular, when using a medium similar to a transmission oil, the water cooler coolant may be semi-permanently used. Additionally, the water cooler coolant tank 210 may include a water cooler coolant inlet 211 that protrudes or extends from an upper surface thereof and a water cooler coolant cap 212 configured to open and close the water cooler coolant inlet 211. Accordingly, when the water cooler coolant is not a coolant which may be used semi-permanently, the water cooler coolant may be supplemented through the water cooler coolant inlet 211, and the water cooler coolant inlet 211 may also be closed by the water cooler coolant cap 212 after the supplement.

The bypass line 220 may be branched from a receiver drier 310, may pass through the water cooler coolant tank 210, and may be configured to communicate with a condensation line 260 that connects a compressor 320 and an air-conditioner condenser 340. In other words, an air-conditioner coolant in a liquid state, exhausted from the receiver drier 310 may flow in the bypass line 220, may be exhausted to the condensation line 260, and may be introduced into the air-conditioner condenser 340. In particular, the compressor 320 may be configured to compress the air-conditioner coolant in a gas state and exhaust the air-conditioner coolant in a high-pressure gas state. Further, the air-conditioner condenser 340 may be configured to condense the air-conditioner coolant in the high-pressure gas state exhausted from the compressor 320 into the liquid state. In addition, the receiver drier 310 may be configured to separate the air-conditioner coolant in the gas state among the air-conditioner coolants exhausted from the air-conditioner condenser 340 to exhaust the air-conditioner coolant in the liquid state.

Further, the bypass line 220 may be disposed to penetrate through between the compressed intake air path 110 and an inner wall of the water cooler coolant tank 210. Accordingly, the water cooler coolant may be configured to cool the compressed intake air flowing in the compressed intake air path 110, and the coolant in the liquid state in the bypass line 220 may be configured to cool the water cooler coolant. Particularly, the bypass line 220 may be branched into a plurality of lines in a section in which it penetrates through between the compressed intake air path 110 and the inner wall of the water cooler coolant tank 210. Accordingly, the air-conditioner coolant may be smoothly circulated in the section in which the bypass line 220 penetrates through the inside of the water cooler coolant tank 210.

Additionally, the water cooler 200 may include a bypass valve 330 and a water cooler coolant circulation pump 350. The bypass valve 330 may be disposed on the bypass line 220 to open or close the bypass line 220. The water cooler coolant circulation pump 350 may be disposed on the bypass line 220 at the back part (e.g., a rear portion) of the bypass valve 330 to exhaust the air-conditioner coolant in the bypass line 220 to the air-conditioner condenser 340. In other words, in the present invention, the water cooler 200 may be cooled by the air-conditioning system, thus the air-conditioner coolant may restrictively flow in the bypass line 220 when the water cooler 200 requires cooling in consideration of indoor cooling efficiency. Accordingly, the bypass valve 330 and the water cooler coolant circulation pump 350 may be used to allow the air-conditioner coolant to flow or not to flow (e.g., to restrict the flow of the coolant) in the bypass line 220. A control method of the hybrid intercooler system as described above will be described below.

Furthermore, the water cooler 200 may include an expansion line 230, an evaporation line 240, and a compression line 250. The expansion line 230, the evaporation line 240, and the compression line 250 may be used within the air-conditioning system of a vehicle. The expansion line 230 may be configured to provide communication between the receiver drier 310 and an expansion valve 360. In particular, the expansion valve 360 may expand the coolant in the high-pressure liquid state to be more easily evaporated. Further, the coolant in a liquid state which is condensed in the air-conditioner condenser 340 may flow in the expansion line 230.

The evaporation line 240 may be configured to provide communication between the expansion valve 360 and a heating core 370. In particular, the heating core 370 may evaporate the coolant in the liquid state and may be configured to cool the air extraneous to the heating core 370 using endothermic reaction generated during the evaporation of the coolant. The coolant in the liquid state expanded in the expansion valve 360 may flow in the evaporation line 240.

Further, the compression line 250 may be configured to provide communication between the heating core 370 and the compressor 320. In particular, the coolant in the gas state evaporated in the heating core 370 may flow in the compression line 250. The condensation line 260 may be configured to provide communication between the compressor 320 and the air-conditioner condenser 340. In particular, the coolant in the high-pressure gas state compressed in the compressor 320 may flow in the condensation line 260. Additionally, a gas-liquid separation line 270 may be configured to provide communication between the air-conditioner condenser 340 and the receiver drier 310. In particular, the air-conditioner coolant in the liquid state condensed in the air-conditioner condenser 340 and the air-conditioner coolant in the gas state which is not condensed may flow in the gas-liquid separation line 270 while being mixed with each other.

FIG. 6 is a flowchart of a control method of a hybrid intercooler system in accordance with another exemplary embodiment of the present invention. Referring to FIG. 6, the control method of a hybrid intercooler system in accordance with another exemplary embodiment of the present invention may include measuring, by a controller, a temperature of an intake air at the outlet of the hybrid intercooler system using a sensor (S100); determining, by the controller, whether the measured temperature of the intake air is greater than a preset reference temperature (S200); and opening the bypass valve 330 and operating the water cooler coolant circulation pump 350 when the measured temperature of the intake air is greater than the preset reference temperature (S300). The opening of the bypass valve 330 and the operation of the water cooler coolant circulation pump 350 as described above may be known as a first control step.

In other words, the temperature of the air (e.g., intake air) compressed by the turbocharger may increase, thus when the air having high temperature is supplied to the combustion chamber, an increase rate of air density may decrease, thus causing a deterioration in a charging efficiency or knocking may be caused. Accordingly, to prevent such problem, whether the water cooler coolant requires cooling may be determined by comparing the temperature of the intake air in the outlet of the hybrid intercooler system and the preset reference temperature. Particularly, the preset reference temperature may be a temperature at which the charging efficiency is deteriorated or knocking is caused, and the preset reference temperature may be set to be different based on a vehicle type, or the like.

Further, in the first control step (S300), the bypass valve 330 may be opened and the water cooler coolant circulation pump 350 may be operated. Accordingly, some of the air-conditioner coolant in the liquid state separated by the receiver drier 310 may pass through the water cooler coolant tank 210 through the bypass line 220 to cool the water cooler coolant in the water cooler coolant tank 210. At the same time, some of the air-conditioner coolant in the liquid state separated by the receiver drier 310 may be supplied to the expansion valve 360 and then evaporated in the heating core 370 to cool indoor air of a vehicle.

The control method of a hybrid intercooler system may further include closing the bypass valve 330 and stopping the operation of the water cooler coolant circulation pump 350 when the measured temperature of the intake air is less than the preset reference temperature (S400). The closing of the bypass valve 330 and the termination of water cooler coolant circulation pump 350 operation as described above may be known as a second control step. In other words, since the temperature of the intake air in the outlet of the hybrid intercooler system is less than the preset reference temperature, when the water cooler coolant does not require cooling, all the air-conditioner coolant in the liquid state separated by the receiver drier 310 may be supplied to the expansion valve 360 and then evaporated in the heating core 270 to cool indoor air of a vehicle. Therefore, the indoor cooling efficiency of a vehicle may be increased.

Particularly, the control method of a hybrid intercooler system may be performed by repeating the measuring of the temperature of the intake air (S100), the determination of whether the measured temperature of the intake air is greater than the preset reference temperature (S200), and the control step (S300 or S400) until key-off (e.g., until the vehicle is turned or powered off). Therefore, the hybrid intercooler system may be continuously operated in a key-on state, to thus improve engine power and fuel efficiency.

In accordance with the exemplary embodiments of the present invention, the temperature of the intake air passing through the inlet of the intercooler may be stabilized using the water cooler, and the cooling efficiency of the intercooler may be significantly increased using the air cooler, thereby significantly improving engine power and fuel efficiency. Further, the water-cooling type intercooler may be cooled by the air-conditioning system without the separate cooling line for cooling the water cooler, thereby preventing the weight and cost from increasing. The temperature of the intake air supplied to the combustion chamber of the engine may be stabilized, thereby decreasing the knocking phenomenon of the engine. Additionally, in accordance with the increase in the cooling efficiency of the intercooler, a size of an opening part of a bumper may be reduced, and thus, air resistance may be decreased to improve fuel efficiency and a degree of freedom of design may be improved.

The foregoing exemplary embodiments are only examples to allow a person having ordinary skill in the art to which the present invention pertains (hereinafter, referred to as "those skilled in the art") to easily practice the present invention. Accordingly, the present invention is not limited to the foregoing exemplary embodiments and the accompanying drawings, and therefore, a scope of the present invention is not limited to the foregoing exemplary embodiments. Accordingly, it will be apparent to those skilled in the art that substitutions, modifications and variations can be made without departing from the spirit and scope of the invention as defined by the appended claims and can also belong to the scope of the present invention.

What is claimed is:

1. A hybrid intercooler system, comprising:
   an air cooler configured to exchange heat with exterior air passing through an outer wall of a plurality of compressed intake air paths to cool a compressed intake air passing through the inside of the compressed intake air paths;
   a water cooler configured to exchange heat between a water cooler coolant enclosing the outer wall of the compressed intake air paths and the compressed intake air cooled in the air cooler, wherein the water cooler includes a water cooler coolant tank that encloses the compressed intake air paths; and
   a bypass line configured to be branched from a receiver drier, pass through the water cooler coolant tank, and communicate with a condensation line that connects a compressor and an air-conditioner condenser.

2. The hybrid intercooler system of claim 1, wherein the bypass line is disposed to penetrate through between the compressed intake air paths and an inner wall of the water cooler coolant tank.

3. The hybrid intercooler system of claim 2, wherein the bypass line is branched into a plurality of lines in a section in which the bypass line penetrates through between the compressed intake air paths and the inner wall of the water cooler coolant tank.

4. The hybrid intercooler system of claim 1, further comprising:
   a bypass valve installed on the bypass line to open or close the bypass line.

5. The hybrid intercooler system of claim 4, further comprising:
   a water cooler coolant circulation pump installed on the bypass line at a back part of the bypass valve to exhaust an air-conditioner coolant in the bypass line to the condensation line.

6. The hybrid intercooler system of claim 1, further comprising:
   an expansion line configured to provide communication between the receiver drier and an expansion valve.

7. The hybrid intercooler system of claim 6, further comprising:
   an evaporation line configured to provide communication between the expansion valve and a heating core.

8. The hybrid intercooler system of claim 7, further comprising:
   a compression line configured to provide communication between the heating core and the compressor.

9. The hybrid intercooler system of claim 8, further comprising:
   a gas-liquid separation line configured to provide communication between the air-conditioner condenser and the receiver drier.

10. The hybrid intercooler system of claim 1, wherein the water cooler coolant tank includes a water cooler coolant inlet that protrudes from an upper surface thereof.

11. The hybrid intercooler system of claim 10, wherein the water cooler coolant tank further includes a water cooler coolant cap configured to open and close the water cooler coolant inlet.

12. A control method of a hybrid intercooler system, including an air cooler configured to exchange heat with exterior air passing through an outer wall of a plurality of compressed intake air paths to cool a compressed intake air passing through the inside of the compressed intake air paths; a water cooler configured to exchange heat between a water cooler coolant enclosing the outer wall of the compressed intake air paths and the compressed intake air cooled in the air cooler wherein the water cooler includes a water cooler coolant tank that encloses the compressed intake air paths; a bypass line configured to be branched from a receiver drier, pass through the water cooler coolant tank, and communicate with a condensation line that connects a compressor and an air-conditioner condenser; a bypass valve installed on the bypass line to open or close the bypass line; and a water cooler coolant circulation pump installed on the bypass line at a back part of the bypass valve to exhaust an air-conditioner coolant in the bypass line to the condensation line, the method comprising:

measuring, by a controller, a temperature of an intake air at an outlet of the hybrid intercooler system using a sensor;

determining, by the controller, whether the measured temperature of the intake air is greater than a preset reference temperature; and opening, by the controller, the bypass valve and operating the water cooler coolant circulation pump when the measured temperature of the intake air is greater than the preset reference temperature.

13. The control method of claim 12, further comprising:

closing, by the controller, the bypass valve and stopping the operation of the water cooler coolant circulation pump when the measured temperature of the intake air is less than the preset reference temperature.

\* \* \* \* \*